(12) United States Patent
Periyaeluvan et al.

(10) Patent No.: US 11,829,277 B2
(45) Date of Patent: Nov. 28, 2023

(54) SYSTEMS AND METHODS FOR REMOTE DEBUGGING

(71) Applicant: DISH NETWORK TECHNOLOGIES INDIA PRIVATE LIMITED, Bangalore (IN)

(72) Inventors: Rakesh Eluvan Periyaeluvan, Madurai (IN); Gopikumar Ranganathan, Madurai (IN); Amit Kumar, Bangalore (IN)

(73) Assignee: DISH NETWORK TECHNOLOGIES INDIA PRIVATE LIMITED, Bangalore (IN)

( * ) Notice: Subject to any disclaimer, the term of this patent is extended or adjusted under 35 U.S.C. 154(b) by 0 days.

(21) Appl. No.: 16/360,926

(22) Filed: Mar. 21, 2019

(65) Prior Publication Data

US 2020/0301818 A1    Sep. 24, 2020

(51) Int. Cl.
| | |
|---|---|
| *G06F 11/36* | (2006.01) |
| *G06F 9/50* | (2006.01) |
| *H04L 67/125* | (2022.01) |
| *H04L 67/02* | (2022.01) |

(52) U.S. Cl.
CPC ........ *G06F 11/3636* (2013.01); *G06F 9/5055* (2013.01); *H04L 67/02* (2013.01); *H04L 67/125* (2013.01)

(58) Field of Classification Search
CPC .... G06F 11/3636; G06F 9/5055; H04L 67/02; H04L 67/125
USPC ........................................................ 717/128
See application file for complete search history.

(56) References Cited

U.S. PATENT DOCUMENTS

| | | | | |
|---|---|---|---|---|
| 6,393,475 | B1 * | 5/2002 | Leong | H04L 41/0253 709/224 |
| 6,742,141 | B1 * | 5/2004 | Miller | G06F 11/366 714/E11.212 |
| 6,928,464 | B2 * | 8/2005 | Appiah | H04L 63/0869 709/227 |
| 6,950,936 | B2 * | 9/2005 | Subramaniam | G06Q 20/382 713/168 |
| 6,973,482 | B2 * | 12/2005 | Mohammed | H04L 63/04 709/208 |
| 7,673,180 | B1 * | 3/2010 | Chen | G06F 11/362 714/38.11 |
| 7,870,153 | B2 * | 1/2011 | Croft | G06F 16/748 709/219 |
| 10,474,518 | B1 * | 11/2019 | Rupavatharam | G06F 11/366 |

(Continued)

*Primary Examiner* — Lewis A Bullock, Jr.
*Assistant Examiner* — Theodore E Hebert
(74) *Attorney, Agent, or Firm* — Xuezhen Tian; VLP Law Group LLP (57) ABSTRACT

Systems and methods for remote debugging perform remote debugging of a receiving device, such as a set-top box or other connected media player, even when the receiving device is located behind a firewall. The receiving device has a persistent outbound connection with a message server. Since it is an outbound connection, it connects across firewall restrictions. A remote debug machine sends a message via the message server to the receiving device over a network. The message carries the command/operation to be executed by the receiving device. The receiving device, which receives the command, executes the command and sends the output of the command to a debug data upload server to which the remote debug machine has access.

14 Claims, 5 Drawing Sheets

(56) References Cited

U.S. PATENT DOCUMENTS

| | | | | |
|---|---|---|---|---|
| 2002/0169980 A1* | 11/2002 | Brownell | H04L 63/0272 | 726/4 |
| 2004/0123271 A1* | 6/2004 | Bindewald | G06F 11/362 | 717/124 |
| 2005/0021772 A1* | 1/2005 | Shedrinsky | H04L 63/0281 | 709/228 |
| 2005/0060124 A1* | 3/2005 | Chen | G06F 11/3636 | 702/185 |
| 2005/0198380 A1* | 9/2005 | Panasyuk | H04L 63/0281 | 709/239 |
| 2005/0267779 A1* | 12/2005 | Lee | H04L 67/75 | 705/26.1 |
| 2006/0031407 A1* | 2/2006 | Dispensa | H04L 61/25 | 709/219 |
| 2006/0168136 A1* | 7/2006 | Bethlehem | H04L 63/102 | 709/219 |
| 2006/0195894 A1* | 8/2006 | Nita | G06F 11/3664 | 726/11 |
| 2006/0195895 A1* | 8/2006 | Ben-Shachar | H04L 63/029 | 726/11 |
| 2007/0233804 A1* | 10/2007 | Palekar | H04L 67/08 | 709/208 |
| 2008/0172574 A1* | 7/2008 | Fisher | G06Q 10/06 | 714/25 |
| 2008/0270612 A1* | 10/2008 | Malakapalli | H04L 63/029 | 709/227 |
| 2010/0058057 A1* | 3/2010 | Sutherland | H04L 63/0428 | 380/278 |
| 2013/0124926 A1* | 5/2013 | Cowie | G06F 11/0736 | 714/45 |
| 2013/0219363 A1* | 8/2013 | Wu | G06F 9/45558 | 717/124 |
| 2014/0245266 A1* | 8/2014 | Sun | G06F 11/3664 | 717/124 |
| 2014/0336795 A1* | 11/2014 | Asenjo | G05B 19/4083 | 700/86 |
| 2016/0028688 A1* | 1/2016 | Chizhov | H04L 69/08 | 726/12 |
| 2016/0077894 A1* | 3/2016 | Scheerer | G06F 9/544 | 719/328 |
| 2016/0285976 A1* | 9/2016 | Chan | H04L 67/142 | |
| 2017/0161167 A1* | 6/2017 | Obermiller | G06F 16/178 | |
| 2018/0060452 A1* | 3/2018 | Esterkin | G06F 11/00 | |
| 2018/0063077 A1* | 3/2018 | Tumuluru | H04L 69/16 | |
| 2018/0129580 A1* | 5/2018 | Merkle | G06F 11/3664 | |
| 2018/0220006 A1* | 8/2018 | Uruma | H04M 7/003 | |
| 2019/0044793 A1* | 2/2019 | Chew | H04L 41/344 | |
| 2019/0044996 A1* | 2/2019 | Weiman | H04L 63/166 | |
| 2019/0215688 A1* | 7/2019 | Zavesky | H04L 63/0281 | |
| 2020/0034572 A1* | 1/2020 | Mundra | G06F 21/85 | |
| 2020/0185091 A1* | 6/2020 | Davis | G06F 16/24578 | |
| 2020/0186427 A1* | 6/2020 | Chunduru Venkata | H04L 63/164 | |

* cited by examiner

SYSTEMS AND METHODS FOR REMOTE DEBUGGING

TECHNICAL FIELD

The disclosure relates to debugging a receiving device and, particularly, to debugging a receiving device remotely.

BRIEF SUMMARY

Media devices, such as set-top boxes and other connected media players, may stop operating or operate incorrectly due to a system malfunction, software error, customer error or other reason, at which point it is helpful to provide customer assistance immediately to the customer operating the device in order to troubleshoot and resolve the problem quickly and efficiently. In such a case, it is important for the entity providing technical assistance to obtain information regarding operation of the device remotely in real time in order to resolve the problem and remotely perform debugging of the system. However, the device may be located behind a firewall or other network security which makes it difficult to obtain such information in an efficient and timely manner. In order to solve this technical problem, remote debugging of the device, even located behind a firewall, is shown and described herein.

The device has a persistent outbound connection with a message server. Since it is an outbound connection, it connects across firewall restrictions. A remote debug machine sends a message via the message server to the device over a network. The message carries the command/ operation to be executed by the device. The device, which receives the command, executes the command and sends the output of the command to a debug data upload server to which the remote debug machine has access.

BRIEF DESCRIPTION OF THE SEVERAL VIEWS OF THE DRAWINGS

The components in the drawings are not necessarily to scale relative to each other. Like reference numerals designate corresponding parts throughout the several views.

DETAILED DESCRIPTION

Figure 1:
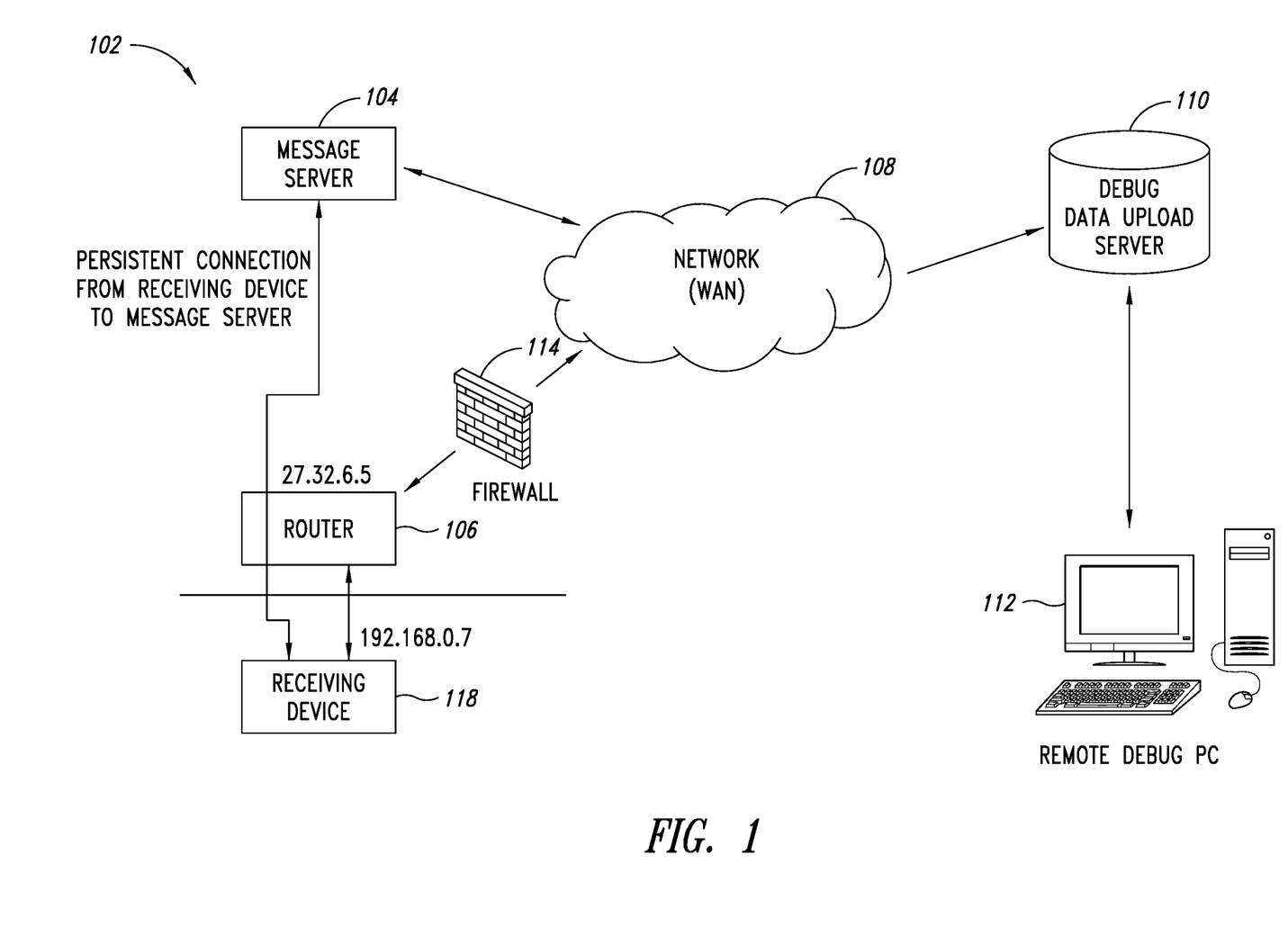
FIG. 1 is an overview block diagram illustrating an example environment in which embodiments of remote debugging may be implemented, according to one example embodiment.

FIG. 1 is an overview block diagram illustrating an example environment 102 in which embodiments of remote debugging may be implemented, according to one example embodiment.

Before providing additional details regarding the operation and constitution of methods and systems for remote debugging, the example environment 102, within which such a system may operate, will briefly be described. In the environment 102, audio, video, and/or data service providers, such as television service providers, provide their customers a multitude of video and/or data programming (hereafter, collectively and/or exclusively "programming"). Such programming is often provided by use of a receiving device 118 (interchangeably referred to herein as "box" or "machine", such as the receiving device 118 with IP address 192.168.0.7 shown in FIG. 1) configured to receive the programming and communicatively coupled directly or indirectly to a presentation device (not shown). The programming may include any type of media content, including, but not limited to: television shows, news, movies, sporting events, documentaries, advertisements, web videos, media clips, etc., in various formats including, but not limited to: standard definition, high definition, 4 k Ultra High-Definition (HD), Ultra HD (UHD), AVI (Audio Video Interleave), FLV (Flash Video Format), WMV (Windows Media Video), MOV (Apple QuickTime Movie), MP4 (Moving Pictures Expert Group 4), WAV (Waveform Audio File Format), MP3 (Moving Picture Experts Group Layer-3 Audio), WMA (Windows Media Audio). PCM (Pulse-Code Modulation), AIFF (Audio Interchange File Format), AAC (Advanced Audio Coding), LPCM (Linear pulse code modulation), and OGG (Vorbis).

The receiving device 118 may interconnect to one or more communications media, sources or other devices (such as a cable head-end, satellite antenna, telephone company switch, Ethernet portal, off-air antenna, other receiving devices, or the like) that provide the programming. The receiving device 118 commonly receives a plurality of programming by way of the communications media or sources. Based upon selection by a user, the receiving device 118 processes and communicates the selected programming to the presentation device.

For convenience, examples of a receiving device may include, but are not limited to, devices such as: a "media player," "streaming media player," "television converter," "receiver," "set-top box," "television receiving device," "television receiver," "television recording device," "satellite set-top box," "satellite receiver," "cable set-top box," "cable receiver," "media player," and/or "television tuner." Accordingly, the receiving device 118 may be any suitable converter device or electronic equipment that is operable to play back programming. Further, the receiving device 118 itself may include user interface devices, such as buttons or switches. In many applications, a remote-control device ("remote", not shown) is operable to control the receiving device and/or the presentation device. The remote typically communicates with the receiving device 118 using a suitable wireless medium, such as infrared ("IR"), radio frequency ("RF"), or the like.

Examples of a presentation device may include, but are not limited to: a television ("TV"), a mobile device, a smartphone, a tablet device, a personal computer ("PC"), a sound system receiver, a digital video recorder ("DVR"), a Digital Video Disc ("DVD") device, game system, or the like. Presentation devices may employ a display, one or more speakers, and/or other output devices to communicate video and/or audio content to a user. In many implementations, one or more presentation devices are communicatively coupled, directly or indirectly, to the receiving device 118. Further, the receiving device and the presentation device may be integrated into a single device. Such a single device may have the above-described functionality of the receiving device 118 and the presentation device, or may even have additional functionality.

It may occur that the receiving device 118 stops operating or operates incorrectly due to a system malfunction, software error, customer error or other reason, at which point it is helpful to provide customer assistance immediately to the customer operating the receiving device 118 in order to troubleshoot and resolve the problem quickly and efficiently. In such a case, it is important for the entity providing technical assistance to obtain information regarding operation of the receiving device 118 remotely in real time in order to resolve the problem and remotely perform debugging, if necessary, of the receiving device system. However, the receiving device 118 is often located behind a firewall 114 or other network security which makes it difficult to obtain such information in an efficient and timely manner.

The architectural design to establish successful remote debugging of the receiving device 118 (or a box/machine), even located behind a firewall, is shown in FIG. 1 and described herein. The receiving device 118 may already have a persistent connection with a Message Server 104. The Message Server connection is an outbound connection. Since it is an outbound connection, it connects across firewall restrictions, including firewall 114.

The Remote debug machine (Remote Debug PC) is a computer that sends a message to the receiving device 118 over a communication system. For example, the communication system is referenced in the diagram above as the Network 108 (which be a WAN), which carries the command/operation to be executed by the receiving device 118 (e.g., the command may be dump file output). The receiving device 118, which receives the command via Message Server 104, executes the command and sends the output of the command to the Debug Data Upload Server 110.

Such may be useful for executing various commands and collecting various information, including, but not limited to:

1. Performing tcpdump (which dumps the network trace and sends the data to the Debug Data Upload Sever 110 via an HTTPs/SFTP connection);
2. Collecting CPU utilization information (e.g., collecting CPU utilization statistics of the receiving device 118);
3. Pulling out any debug files required from the receiving device 118; and
4. Rebooting the receiving device 118 if required, etc.

The Network 108 may include many different types of communication media, now known or later developed. Non-limiting media examples include telephone systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems. The Network 108 may include any telecommunications network, computer network, or combination of telecommunications and computer networks that enables applicable communication between the various devices connected to the communication system shown in the diagram above. For example, a communications network of Network 108 may include a wide area network (WAN) that communicates over many miles or local area network (LAN) that uses wireless fidelity (Wi-Fi) high frequency radio signals to transmit and receive data over distances of a few hundred feet. The local area network may be a wireless local area network (WLAN) based on the Institute of Electric and Electronic Engineers (IEEE) 802.11 standards. However, other wired and wireless communications networks and protocols may be used to link the various devices and systems shown in the diagram above. Thus, systems shown in FIG. 1 may have various applicable wireless transmitters and receivers and, in the case of using a Wi-Fi wireless link, may also have the corresponding executable Wi-Fi compatible network communications software that initiates, controls, maintains or manages the wireless link between the systems shown in the diagram above and the various other devices and systems within or Network 108 over the Wi-Fi signal of communication system.

The Network 108 may comprise connections to the systems shown in FIG. 1 that provide services to the systems shown in FIG. 1, and may itself represent multiple interconnected networks. For instance, wired and wireless enterprise-wide computer networks, intranets, extranets, and/or the Internet may be included in or comprise a part of Network 108. Embodiments may include various types of communication networks including other telecommunications networks, cellular networks and other mobile networks. There may be any variety of computers, switching devices, routers, bridges, firewalls, edge devices, multiplexers, phone lines, cables, telecommunications equipment and other devices within communication system and/or in the communications paths between the receiving device 118 and other devices shown in FIG. 1. Some or all of such equipment of communication system may be owned, leased or controlled by third-party service providers.

In accordance with an aspect of the disclosure, the receiving device 118, Router 106, Message Server 104, Remote Debug PC 112 and/or Debug Data Upload Server 110 may contain discrete functional program modules that might make use of an application programming interface (API), or other object, software, firmware and/or hardware, to request services of each other (e.g., message services, debugging services and information requests) and/or one or more of the other entities within or connected to the Network 108.

For example, communication can be provided over a communications medium, e.g., client and server systems running on any of the receiving device 118 or other devices shown in FIG. 1. These client and server systems may be coupled to one another via transmission control protocol/internet protocol (TCP/IP) connection(s) for high-capacity communication. The "client" is a member of a class or group that uses the services (e.g., message services and/or debug data upload services) of another class or group to which it is not related. In computing, a client is a process, i.e., roughly a set of instructions or tasks, executed by hardware that requests a service provided by another program. Generally, the client process utilizes the requested service without having to "know" any working details about the other program or the service itself. In a client/server architecture, particularly a networked system, a client is usually a computer or device that accesses shared network resources provided by another computer or device, e.g., a server. In the example in the FIG. 1, the receiving device 118 and/or Remote Debug PC 112 may be a client requesting the services of a the Message Server 104 and/or Debug Data Upload Server 110 acting as server(s). However, any entity in the diagram above, including the receiving device, can be considered a client, a server, or both, depending on the circumstances.

One or more cellular towers and stations may be part of a cellular network that is part of the Network 108 and may be communicatively linked by one or more communications networks or communication mediums within the Network 108 (e.g., using a cellular or other wired or wireless signal) in order to facilitate sending and receiving information in the form of synchronous or asynchronous data. This communication may be over a wireless signal on the cellular network of communication system using applicable combinations and layers of telecommunications and networking protocols and standards such as fourth generation broadband cellular network technology (4G), Long Term Evolution (LTE), HTTP and TCP/IP, etc.

Although the physical aspects of environment 102, including the receiving device 118, Router 106, Message Server 104, Debug Data Upload Server 110 and Remote Debug PC 112, may have connected devices such as computers, the physical environment may alternatively have or be described as comprising various digital devices such as smartphones, tablets, personal digital assistants (PDAs), televisions, MP3 players, etc.; software objects such as interfaces, Component Object Model (COM) objects; and the like.

There are a variety of systems, components, and network configurations that may also support distributed computing and/or cloud-computing environments within the communication system. For example, computing systems may be connected together within the Network 108 by wired or wireless systems, by local networks or by widely distributed networks. Currently, many networks are coupled to the Internet, which provides an infrastructure for widely distributed computing and encompasses many different networks. Any such infrastructures, whether coupled to the Internet or not, may be used in conjunction with, be connected to, or comprise part of Network 108.

Although not required, the embodiments will be described in the general context of computer-executable instructions, such as program application modules, objects, or macros stored on computer- or processor-readable storage media and executed by a computer or processor. Those skilled in the relevant art will appreciate that the illustrated embodiments as well as other embodiments can be practiced with other system configurations and/or other computing system configurations, including hand-held devices, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network such as communication system. In a distributed computing environment, program modules may be located in both local and remote memory storage devices.

Figure 2:
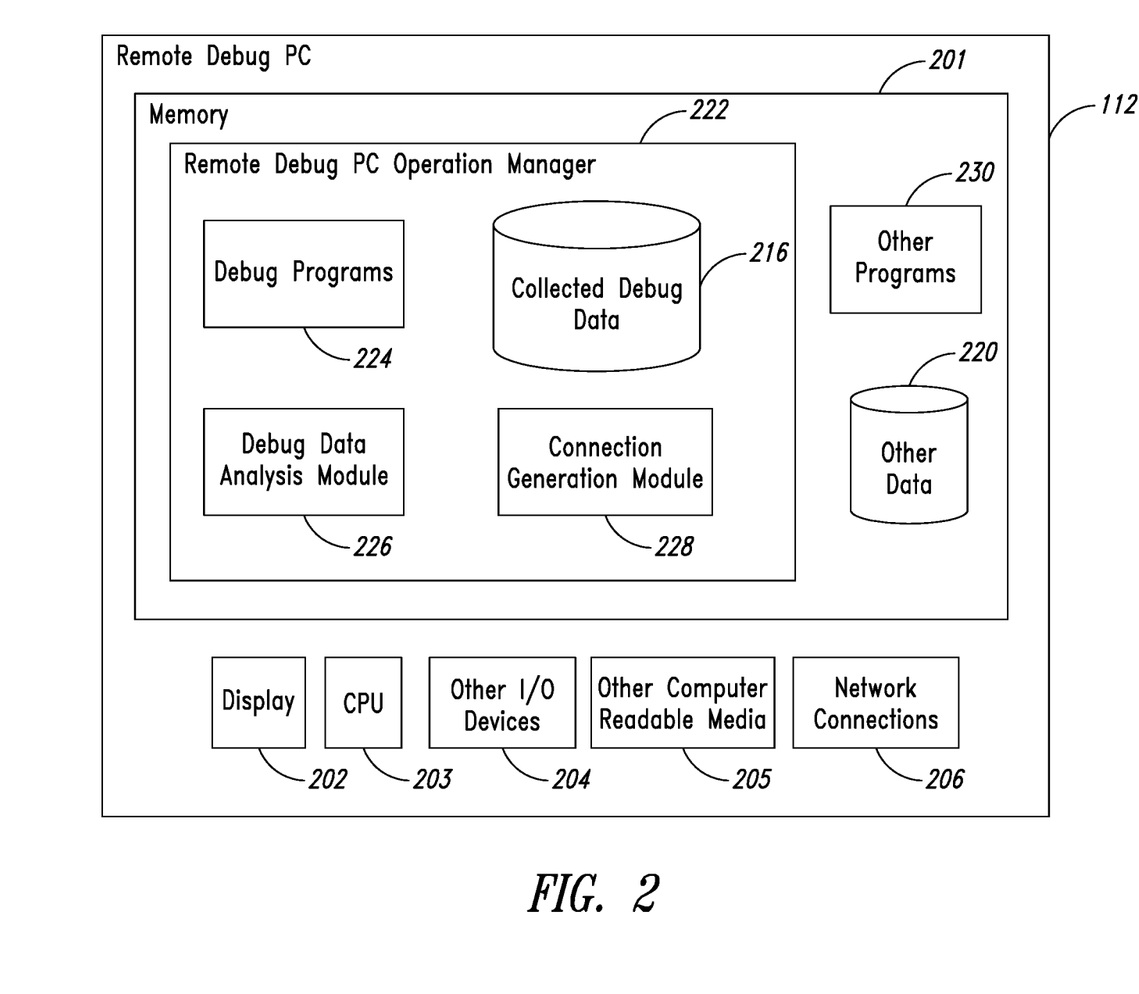
FIG. 2 is a block diagram illustrating elements of an example remote debug PC used in remote debugging, according to one example embodiment.

FIG. 2 is a block diagram illustrating elements of an example Remote Debug PC 112 used in remote debugging, according to one example embodiment. In various embodiments, some or all of the components, modules, connections, operation and functionality, or equivalents thereto, of the Remote Debug PC 112 shown in FIG. 1 and/or described herein may also or instead, as applicable, be that of the receiving device 118, Router 106, Message Server 104, Debug Data Upload Server 110 shown in FIG. 1 and perform the functionality of those devices as described herein.

The Remote Debug PC 112 may facilitate providing technical assistance by obtaining information regarding operation of the receiving device 118 remotely in real time in order to resolve problems experienced by the receiving device 118 and remotely perform debugging of the receiving device system 118. The receiving device 118 is often located behind a firewall 114 or other network security which makes it difficult to obtain such information in an efficient and timely manner. However, the present disclosure provides an improvement in the technology of computer system and media device operation in that it utilizes a persistent connection with Message Server 104 to send commands to be performed by the receiving device 118 for troubleshooting and debugging purposes across such network security measures and to access information from the receiving device that may be used for debugging.

Note that one or more general purpose or special purpose computing systems/devices may be used as part of or in conjunction with the Remote Debug PC 112 to send, over Network 108, a message (carrying a command to be executed by the receiving device 118) to the receiving device 118 via Message Server 104 that has an existing persistent outbound connection established by the receiving device 118 across restrictions of the firewall 114 and receive, over Network 108, via Debug Data Upload Server 110, and in response to execution of the command by the receiving device 118, output from the receiving device 118 resulting from execution of the command.

In addition, in some embodiments, the Remote Debug PC 112 may comprise one or more distinct computing systems/devices and may span distributed locations. Furthermore, each block shown may represent one or more such blocks as appropriate to a specific embodiment or may be combined with other blocks. Also, the remote debug PC operation manager 222 may be implemented in software, hardware, firmware, or in some combination to achieve the capabilities described herein.

In the embodiment shown, Remote Debug PC 112 comprises a computer memory ("memory") 201, a display 202 (including, but not limited to a light emitting diode (LED) panel, cathode ray tube (CRT) display, liquid crystal display (LCD), touch screen display, etc.), one or more Central Processing Units ("CPU") 203, Input/Output ("I/O") devices 204 (e.g., keyboard, mouse, RF or infrared receiver, universal serial bus (USB) ports, other communication ports, and the like), other computer-readable media 205 and network connections 206. The remote debug PC operation manager 222 is shown residing in memory 201. In other embodiments, some portion of the contents and some, or all, of the components of the remote debug PC operation manager 222 may be stored on and/or transmitted over the other computer-readable media 205. The components of the Remote Debug PC 112 and operation manager 222 preferably execute on one or more CPUs 203 and facilitate sending, over Network 108, a message (carrying a command to be executed by the receiving device 118) to the receiving device 118 via Message Server 104 that has an existing persistent outbound connection established by the receiving device 118 across restrictions of the firewall 114 and receiving, over Network 108, via Debug Data Upload Server 110, and in response to execution of the command by the receiving device 118, output from the receiving device 118 resulting from execution of the command. The output from the receiving device 118 resulting from execution of the command and other pertinent data from the receiving device 118 may be stored in collected debug data storage repository 216. The received output from the receiving device 118 resulting from execution of the command may include, but is not limited to, one or more of: CPU utilization data regarding CPU utilization of a CPU of the receiving device 118, debug files from the receiving device 118 and data representing the dump of a network trace. Also, the output from the receiving device 118 that includes data representing the dump of the network trace may be sent via an HTTPs/SFTP connection via Network 108.

Analysis to perform debugging and troubleshooting may be performed by a debug data analysis module 226 of the remote debug PC operation manager 222. Such analysis may be based on the output from the receiving device 118 resulting from execution of the command and other pertinent data from the receiving device 118 stored in collected debug data storage repository 216. Various debug programs 224 may cause commands to be sent to the receiving device 118 via a connection established by a connection generation module 228. The connection may be a persistent outbound connection from the receiving device 118 to the Message Server 104 across restrictions of the firewall 114. Such commands sent to the receiving device 118 may include, but are not limited to: dump a file output, reboot the receiving device 118, dump the network trace (e.g., tcpdump).

Other code or programs 230 (e.g., further data processing modules, a user interface manager module, a Web server, and the like), and potentially other data repositories, such as other data repository 220 for storing other data (receiving device profiles, customer or user profiles, troubleshooting and debugging standards, preferences and configuration data, etc.), also reside in the memory 201, and preferably execute on one or more CPUs 203. Of note, one or more of the components in FIG. 2 may or may not be present in any specific implementation. For example, some embodiments may not provide other computer readable media 205 or a display 202.

In some embodiments, the remote debug PC 118 and operation manager 222 include an application program interface ("API") that provides programmatic access to one or more functions of the Remote Debug PC 112 and operation manager 222. For example, such an API may provide a programmatic interface to one or more functions of the Remote Debug PC operation manager 222 that may be invoked by one of the other programs 230; one or more devices shown in FIG. 1, such as the receiving device 118, Router 106, Message Server 104, Debug Data Upload Server 110 shown in FIG. 1. In this manner, the API may facilitate the development of third-party software, such as various different service applications, user interfaces, plug-ins, adapters (e.g., for integrating functions of the Remote Debug PC operation manager into desktop applications), and the like to facilitate remote debugging using the Remote Debug PC 112 and other remote devices.

In an example embodiment, components/modules of the Remote Debug PC 112 and remote debug PC operation manager 222 are implemented using standard programming techniques. For example, the remote debug PC operation manager 222 may be implemented as a "native" executable running on the CPU 203, along with one or more static or dynamic libraries. In other embodiments, the Remote Debug PC 112 and operation manager 222 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the Remote Debug PC 112 to perform the functions of the remote debug PC operation manager 222. In one embodiment, instructions cause the CPU 203 or some other processor, such as an I/O controller/processor, to send, over Network 108, a message (carrying a command to be executed by the receiving device 118) to the receiving device 118 via Message Server 104 that has an existing persistent outbound connection established by the receiving device 118 across restrictions of the firewall 114 and receive, over Network 108, via Debug Data Upload Server 110, and in response to execution of the command by the receiving device 118, output from the receiving device 118 resulting from execution of the command.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs or other processors. Some embodiments may execute concurrently and asynchronously, and communicate using message passing techniques. Equivalent synchronous embodiments are also supported by remote debug PC operation manager 222 implementation. Also, other functions could be implemented and/or performed by each component/module, and in different orders, and by different components/modules, yet still achieve the functions of the Remote Debug PC 112 and remote debug PC operation manager 222.

In addition, programming interfaces to the data stored as part of the Remote Debug PC 112 and operation manager 222, can be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. The collected debug data storage repository 216 and other data repository 220 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the remote debug PC operation manager 222.

Furthermore, in some embodiments, some or all of the components of the Remote Debug PC 112 and remote debug PC operation manager 222 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

In an example where the CPU 203 is part of the receiving device 118, in one embodiment, instructions cause the CPU 203 or some other processor, such as an I/O controller/processor, to receive over Network 108, from the remote debugging PC 112, a message carrying a command via Message Server 104 to the receiving device 118 through the existing persistent outbound connection established by the receiving device 118 across restrictions of the firewall 114; execute the command; and, in response to execution of the command, send over Network 108 to the Debug Data Upload Server 110, output from the receiving device resulting from execution of the command.

Figure 3:
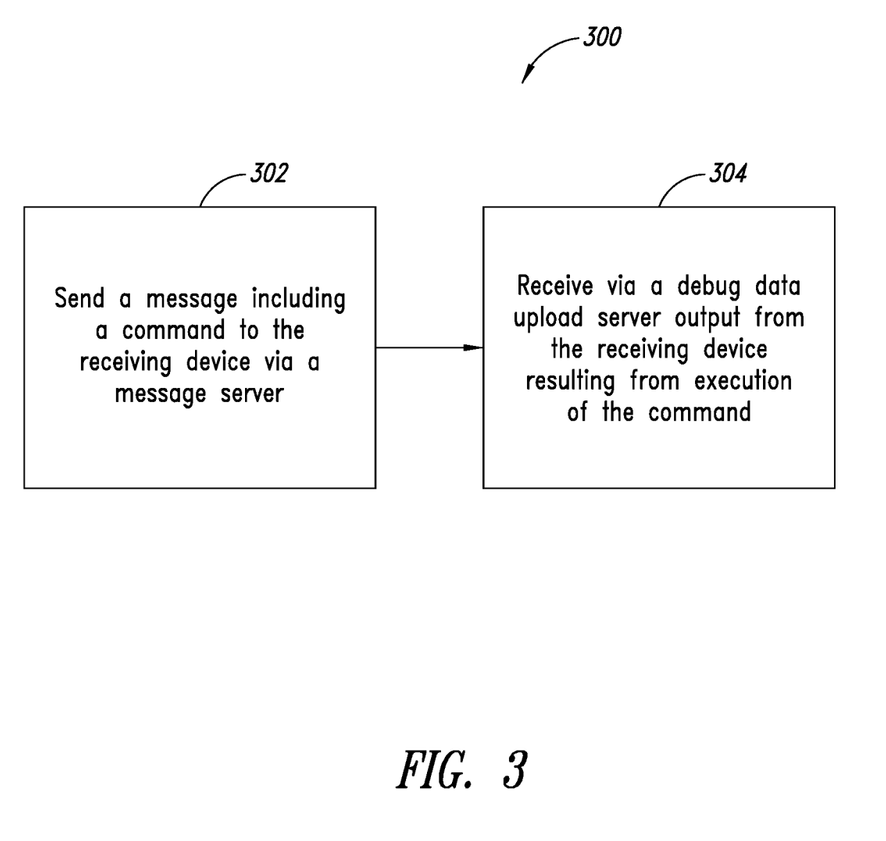
FIG. 3 is a flow diagram of an example method for remote debugging that may be performed by the remote debug PC, according to one example embodiment.

FIG. 3 is a flow diagram of an example method 300 for remote debugging that may be performed by the Remote Debug PC 112, according to one example embodiment.

At 302, the Remote Debug PC 112 sends, over Network 108, a message to the receiving device 118 via the Message Server 104, that has an existing persistent outbound connection established by the receiving device 118 across restrictions of a firewall 114. The message carries a command to be executed by the receiving device 118. The Remote Debug PC 112 is remote from the receiving device and separated from the receiving device by the firewall 114.

At 304, the Remote Debug PC 112 receives the message, over Network 108, via the Debug Data Upload Server 110, and in response to execution of the command by the receiving device 118, output from the receiving device results from execution of the command. The Debug Data Upload Server 110 is remote from the Remote Debug PC 112.

Figure 4:
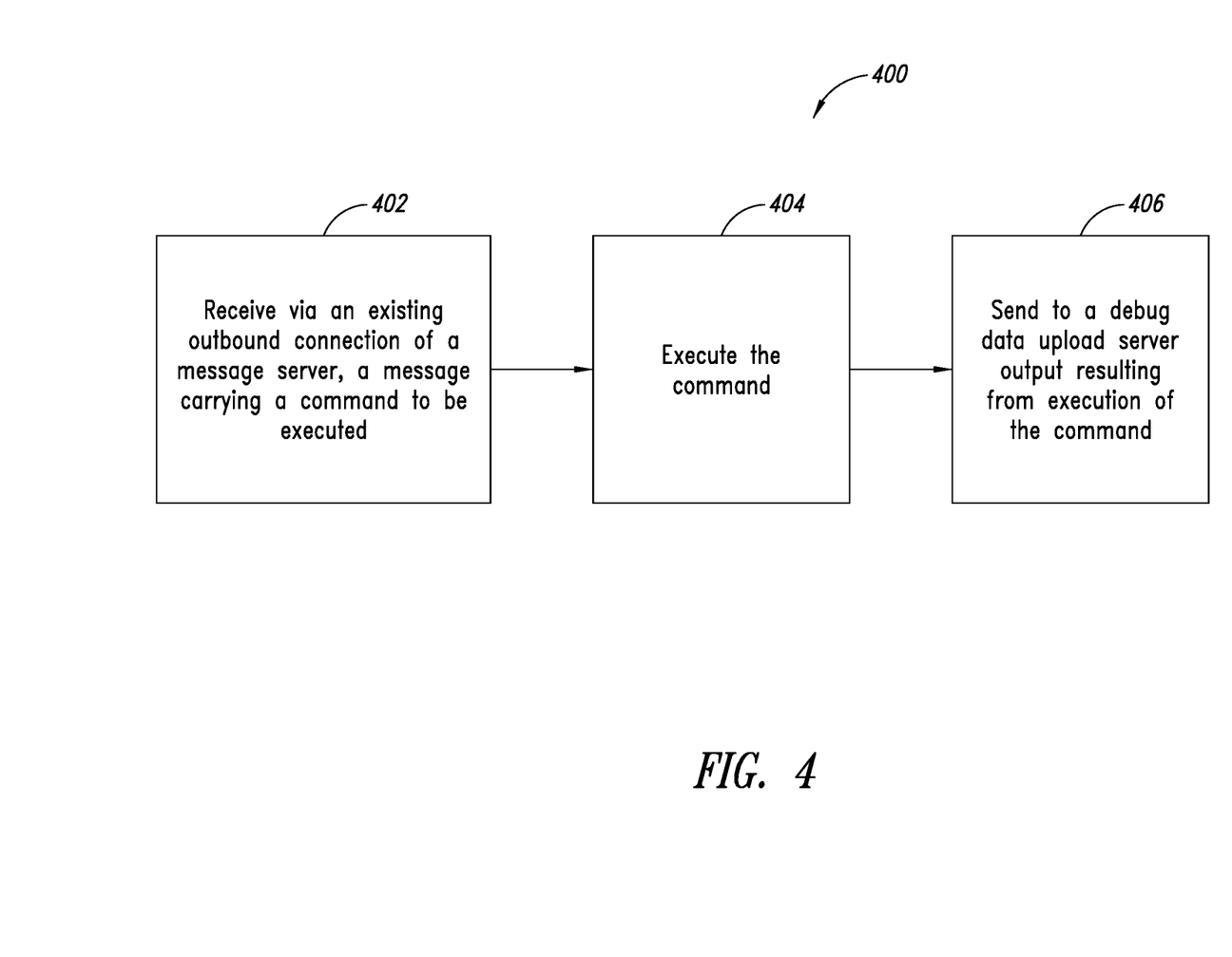
FIG. 4 is a flow diagram of an example method for remote debugging that may be performed by the receiving device, according to one example embodiment.

FIG. 4 is a flow diagram of an example method 400 for remote debugging that may be performed by the receiving device 118, according to one example embodiment.

At 402, the receiving device 118, receives over Network 108, from the Remote Debug PC 112, a message via the Message Server 104 that has an existing persistent outbound connection established by the receiving device 118 across restrictions of the firewall 114. The message carries a command to be executed by the receiving device 118. The Remote Debug PC 112 is remote from the receiving device 118 and separated from the receiving device 118 by the firewall 114.

At 404, the receiving device 118 executes the command carried by the message received from the Message Server 104.

At 406, the receiving device 118, in response to execution of the command, sends over Network 108 to a Debug Data Upload Server 110 remote from the receiving device 118, output from the receiving 118 device resulting from execution of the command.

Figure 5:
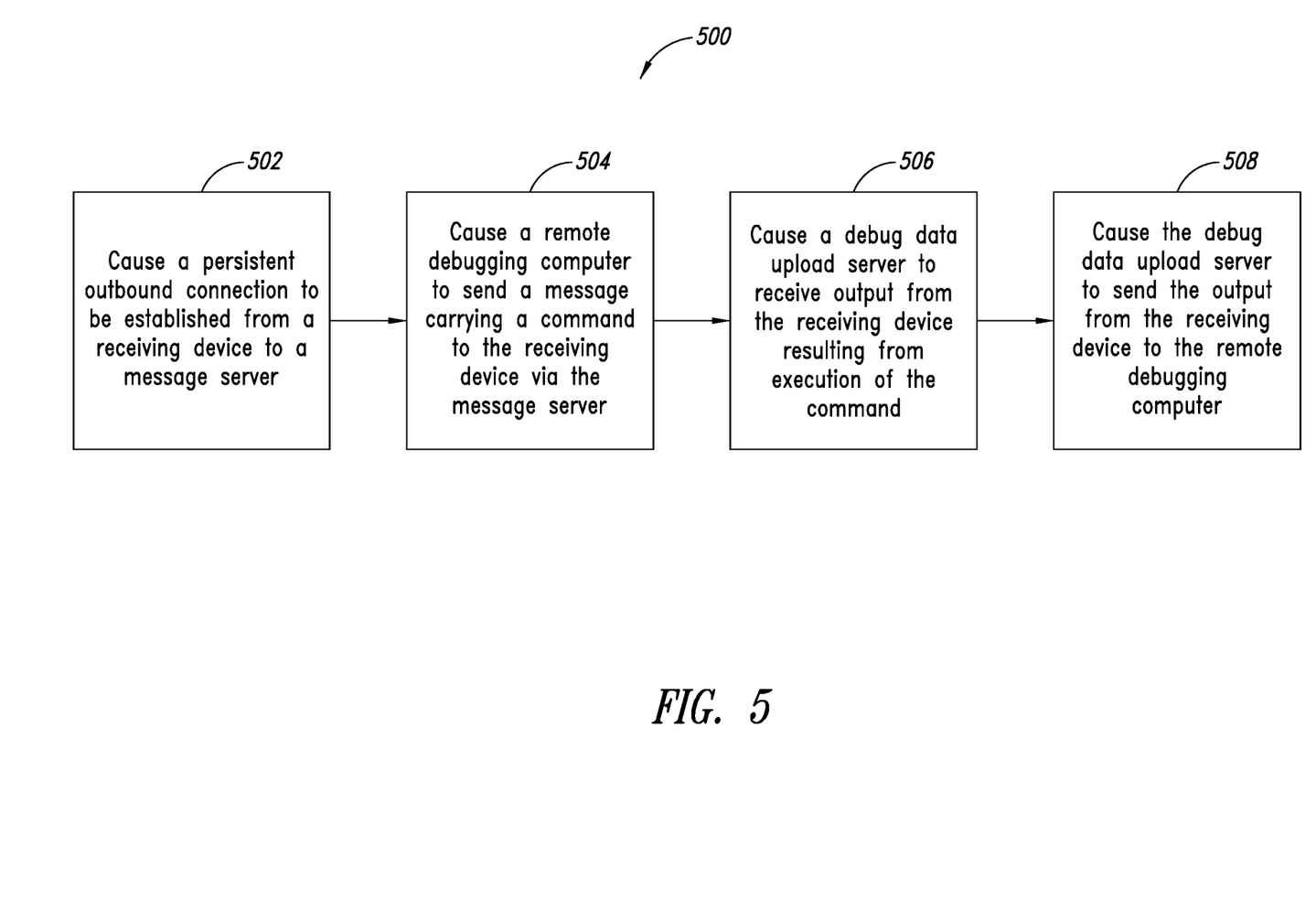
FIG. 5 is a flow diagram of an example method for remote debugging from the perspective of the overall remote debugging system, according to one example embodiment.

FIG. 5 is a flow diagram of an example method 500 for remote debugging from the perspective of the overall remote debugging system shown in environment 102, according to one example embodiment At 502, the system causes a persistent outbound connection to be established from the receiving device 118 to the Message Server 104 across restrictions of the firewall 114.

At 504, the system causes the Remote Debug PC 112 to send a message to the receiving device 118 via the Message Server 104. The message carries a command to be executed by the receiving device 118. The Remote Debug PC 112 is remote from the receiving device 118 and separated from the receiving device 118 by the firewall 114.

At 506, the system causes the Debug Data Upload Server 110, in response to execution of the command by the receiving device 118, to receive output from the receiving device 118 resulting from execution of the command. The Debug Data Upload Server 110 is remote from the Remote Debug PC 112.

At 508, the system causes the Debug Data Upload Server 110 to send the output from the receiving device 118 to the Remote Debug PC 112. The Remote Debug PC 112 may then perform troubleshooting and debugging of the receiving device system based on the received output from the receiving device 118.

While various embodiments have been described herein above, it is to be appreciated that various changes in form and detail may be made without departing from the spirit and scope of the invention(s) presently or hereafter claimed.

The invention claimed is:

1. A method for remote debugging of a receiving device, the method comprising:
providing technical assistance to a receiving device in real time using a remote debugging computer via a message server by at least obtaining information regarding operation of the receiving device remotely in real time, wherein the remote debugging computer is remote from the receiving device and separated from the receiving device by the firewall, wherein the message server has an existing persistent outbound connection that was established by the receiving device across restrictions of the firewall, wherein after the existing persistent outbound connection was established and before sending any message to the receiving device via the message server carrying a command to be executed by the receiving device, the receiving device stops operating or operates incorrectly due to a system malfunction, software error, or customer error, wherein the obtaining the information regarding operation of the receiving device remotely in real time includes:
sending over a computer network, by the remote debugging computer and via the message server, a message through the existing persistent outbound connection, wherein the message carries a command to be executed by the receiving device, and is to collect debug files from the receiving device; and
receiving over a computer network, via a debug data upload server that is different hardware than the message server and is remote from the remote debugging computer and from the message server, in response to execution of the command by the receiving device, output from the receiving device resulting from the execution of the command, wherein the received output from the receiving device includes debug files from the receiving device.

2. The method of claim 1 wherein the command is to dump a network trace.

3. The method of claim 2 wherein the received output from the receiving device resulting from execution of the command includes data representing the dump of the network trace.

4. The method of claim 3 wherein the output from the receiving device that includes data representing the dump of the network trace is received via an HTTPs/SFTP connection.

5. The method of claim 1 wherein the received output from the receiving device resulting from execution of the command includes CPU utilization data regarding CPU utilization of a CPU of the receiving device.

6. The method of claim 1 wherein the command is to reboot the receiving device.

7. A system for remote debugging, comprising:
a receiving device including at least one processor;
a message server that is remote from the receiving device;
a remote debugging computer that is remote from the receiving device and the message server, and is separated from the receiving device by a firewall; and
a debug data upload server that is different hardware than the message server and is remote from the receiving device and from the remote debugging computer;
at least one memory coupled to the at least one processor, the at least one memory having instructions thereon that, when executed by the at least one processor, cause the receiving device to:
before receiving any message carrying a command to be executed by the receiving device, establish a persistent outbound connection from the receiving device to the message server and across restrictions of the firewall, wherein after establishing the existing persistent outbound connection and before receiving any message via the message server carrying a command to be executed by the receiving device, the receiving device stops operating or operates incorrectly due to a system malfunction, software error, or customer error, and in response; and
receiving technical assistance in real time using the remote debugging computer via the message server by at least obtaining information regarding operation of the receiving device remotely in real time, wherein the obtaining the information regarding operation of receiving device remotely in real time includes:
receiving over a computer network, from the remote debugging computer, a message via the message server, the message carrying a command to be executed by the receiving device, wherein the command is to collect debug files from the receiving device;
executing the command; and
in response to execution of the command, sending over a computer network to the debug data upload server, output from the receiving device resulting from execution of the command, wherein the output from the receiving device includes debug files from the receiving device.

8. The system of claim 7 wherein the command is to dump a network trace.

9. The system of claim 8 wherein the output from the receiving device resulting from execution of the command includes data representing the dump of the network trace.

10. The system of claim 9 wherein the output from the receiving device that includes data representing the dump of the network trace is sent via an HTTPs/SFTP connection.

11. The system of claim 7 wherein the output from the receiving device resulting from execution of the command includes CPU utilization data regarding CPU utilization of a CPU of the receiving device.

12. The system of claim 7 wherein the command is to reboot the receiving device.

13. A non-transitory computer-readable storage medium having computer-executable instructions stored thereon for remote debugging of a receiving device using a remote debugging computer, wherein the computer-executable instructions, when executed by at least one processor of the remote debugging computer, cause the remote debugging computer to perform operations, the operations comprising:
providing technical assistance to the receiving device in real time via a message server by at least obtaining information regarding operation of the receiving device remotely in real time, wherein the remote debugging computer is remote from the receiving device and separated from the receiving device by the firewall, wherein the message server has an existing persistent outbound connection that was established by the receiving device across restrictions of the firewall, wherein after the existing persistent outbound connection was established and before sending any message to the receiving device via the message server carrying a command to be executed by the receiving device, the receiving device stops operating or operates incorrectly due to a system malfunction, software error, or customer error, wherein the obtaining the information regarding operation of the receiving device remotely in real time includes:
sending over a computer network and via the message server, a message through the existing persistent outbound connection, wherein the message carries a command to be executed by the receiving device, and is to collect debug files from the receiving device; and
receiving over a computer network, via a debug data upload server that is different hardware than the message server and is remote from the remote debugging computer and from the message server, in response to execution of the command by the receiving device, output from the receiving device resulting from the execution of the command, wherein the received output from the receiving device includes debug files from the receiving device.

14. The non-transitory computer-readable storage medium of claim 13 wherein the output from the receiving device resulting from execution of the command includes CPU utilization data regarding CPU utilization of a CPU of the receiving device.

* * * * *